United States Patent
Heath et al.

(10) Patent No.: US 7,554,783 B2
(45) Date of Patent: Jun. 30, 2009

(54) HIGH-POWER FOLDBACK MECHANISM IN SYSTEM FOR PROVIDING POWER OVER COMMUNICATION LINK

(75) Inventors: Jeffrey Lynn Heath, Santa Barbara, CA (US); Jacob Herbold, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 191 days.

(21) Appl. No.: 11/252,565

(22) Filed: Oct. 19, 2005

(65) Prior Publication Data

US 2006/0164774 A1    Jul. 27, 2006

Related U.S. Application Data

(60) Provisional application No. 60/646,509, filed on Jan. 25, 2005.

(51) Int. Cl.
*H02H 3/08* (2006.01)
*H02H 9/02* (2006.01)
*H02H 9/08* (2006.01)
*H02H 3/00* (2006.01)

(52) U.S. Cl. .............. 361/93.1; 361/93.7; 361/93.9; 361/78; 361/79

(58) Field of Classification Search .......... 361/93.1
See application file for complete search history.

(56) References Cited

U.S. PATENT DOCUMENTS

| | | | | |
|---|---|---|---|---|
| 4,792,745 A | * | 12/1988 | Dobkin | 323/269 |
| 6,169,425 B1 | | 1/2001 | Spires et al. | |
| 6,212,411 B1 | * | 4/2001 | Mulder et al. | 455/572 |
| 6,473,608 B1 | * | 10/2002 | Lehr et al. | 455/402 |
| 6,973,394 B2 | | 12/2005 | Jaeger et al. | |
| 7,215,180 B2 | * | 5/2007 | Nagata et al. | 327/538 |
| 2002/0191553 A1 | | 12/2002 | Lehr et al. | |
| 2004/0212423 A1 | | 10/2004 | Inagaki | |

FOREIGN PATENT DOCUMENTS

| | | |
|---|---|---|
| CN | 1364026 A | 8/2002 |
| CN | 1157022 C | 7/2004 |
| CN | 1540858 A | 10/2004 |
| CN | 1545246 A | 11/2004 |

OTHER PUBLICATIONS

Linear Technology LTC4259A—Quad IEEE 802.3af Power Over Ethernet Controller With AC Disconnect 2004—Data Sheet pp. 1-32.*

(Continued)

*Primary Examiner*—Albert W Paladini
*Assistant Examiner*—Dharti Patel
(74) *Attorney, Agent, or Firm*—McDermott Will & Emery LLP

(57) ABSTRACT

A novel system for providing power over the Ethernet includes a current limit circuit for preventing an output current from exceeding a current threshold set at a prescribed level, and a foldback circuit for reducing the current threshold when an output voltage is lower than a prescribed voltage value. The foldback circuit may be controlled to operate in a high-power mode to increase the current threshold above the prescribed level.

21 Claims, 3 Drawing Sheets

OTHER PUBLICATIONS

Linear Technology LTC4257—Power Over Ethernet Interface Controller 2003—Data Sheet pp. 1-20.*
Chinese Office Action issued in Chinese Patent Application No. 200680005472X dated Nov. 7, 2008.
Chinese Office action issued in Chinese Patent Application No. 2006800031997 dated Nov. 7, 2008.
Chinese Office Action issued in Chinese Patent Application No. 2006800031925 dated Nov. 7, 2008.
LTC4257 A IEEE 802.3af.PD Power over Ethernet Interface Controller.
Chinese Office Action issued in Chinese Patent Application No. 2006800093495, dated Dec. 5, 2008.

* cited by examiner

HIGH-POWER FOLDBACK MECHANISM IN SYSTEM FOR PROVIDING POWER OVER COMMUNICATION LINK

This application claims priority of provisional U.S. patent application No. 60/646,509 filed on Jan. 25, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for carrying out a foldback procedure in a system for supplying power over a communication link, such as an advanced Power over Ethernet (PoE) system.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature defined by the IEEE 802.3af standard.

If the detection signature is valid, the PD has an option of presenting a classification signature to the PSE to indicate how much power it will draw when powered up. A PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD, the PSE applies the required power to the PD.

A semiconductor device, such as a MOSFET, may be used for controlling power from the PSE. During power-up and short-circuit conditions power dissipation in the MOSFET may be much higher than power dissipation when nominal power is provided. To limit the power dissipation, a foldback mechanism is prescribed by the IEEE 802.3af standard. In particular, the standard defines that during startup for port voltages between 10V and 30V, the minimum requirement for an output current in startup mode ($I_{Inrush}$) is 60 mA. For port voltages above 30V, the current $I_{Inrush}$ is required to be in the range from 400 mA to 450 mA. This 400 mA to 450 mA $I_{Inrush}$ requirement applies for duration of the 50 ms to 75 ms $T_{LIM}$ timer.

FIG. 1 shows a diagram that graphically illustrates the IEEE 802.3af foldback requirements. In particular, the gray areas in FIG. 1 show combinations of PSE output voltages and output currents that are not allowed by the IEEE 802.3af standard. The black line in FIG. 1 illustrates a possible foldback curve representing the output current of the PSE at a level between 400 mA and 450 mA for output voltages above 30V and gradually reduced for output voltages below 30V.

However, for a high-power PSE capable of providing higher power (as opposed to higher voltages) than the 400 mA to 450 mA current prescribed by the IEEE 802.3af standard. Because higher currents cause higher MOSFET power dissipation, it would be desirable to have foldback that provides further reduction in power than afforded by the regular IEEE 802.3af foldback mechanism.

Therefore, there is a need for a programmable foldback mechanism capable of adjusting current limits to enable a PoE system to operate in a high-power mode and in a IEEE 802.3af compliant mode.

SUMMARY OF THE DISCLOSURE

The present disclosure offers a novel system and methodology for providing power to a PD in an advanced PoE system. In accordance with one aspect of the disclosure, a power supply device, such as a PSE, includes a current limit circuit for preventing an output current of the PSE from exceeding a current threshold set at a prescribed level, and a foldback circuit for reducing the current threshold when an output voltage of the PSE is lower than a prescribed voltage value. The foldback circuit may be controlled to operate in a high-power mode to increase the current threshold above the prescribed level.

In particular, the foldback circuit may operate in a first high-power mode to increase the current threshold above the prescribed level when the output voltage of the PSE is not less than the prescribed voltage value.

Also, the foldback circuit may operate in a second high-power mode to increase the current threshold above the prescribed level in accordance with a voltage across a semiconductor device, such as a MOSFET or bipolar transistor, used to supply power from the PSE to the PD.

More specifically, in the second high-power mode, the current threshold may be increased above the prescribed level when the voltage across the semiconductor device is less than a predetermined value. When the voltage across the semiconductor device is not less than the predetermined value and the output voltage of the PSE is not less than the prescribed voltage value, the foldback circuit may maintain the current threshold at the prescribed level. Further, when the output voltage of the PSE is lower than the prescribed voltage value, the foldback circuit may reduce the current threshold.

The operation of the foldback circuit may be adjusted in accordance with temperature. In particular, at a first temperature, the foldback circuit may increase the current threshold above the prescribed level when the voltage across the semiconductor device is less than a first predetermined value; and at a second temperature higher than the first temperature, the foldback circuit may increase the current threshold above the prescribed level when the voltage across the semiconductor device is less than a second predetermined value smaller than the first predetermined value. The foldback circuit may be controlled between the first and second high-power mode based on the temperature.

The foldback circuit may be switched to the high-power mode when a high-power PD is detected at an output of the PSE. In particular, in response to a first control signal, the foldback circuit may switch into the first high-power mode, and in response to a second control signal, the foldback circuit may switch into a second high-power mode. The first high-power mode may be selected if the semiconductor device has high power dissipation capabilities. If the semiconductor device is capable of dissipating less power, the second high-power mode may be selected.

In accordance with a method of the present disclosure, the following steps are carried out for providing power to a load via a semiconductor device:

setting a current threshold at a prescribed level to prevent an output current of a power supply from exceeding the current threshold, reducing the current threshold when an output voltage of the power supply is lower than a prescribed voltage value, and switching to a high-power mode to increase the current threshold above the prescribed level.

Operations in a first high-power mode may be carried out to increase the current threshold above the prescribed level when the output voltage of the power supply is not less than the prescribed voltage value.

Operations in a second high-power mode may be carried out to increase the current threshold above the prescribed level when a voltage across the semiconductor device is less than a predetermined value.

In accordance with another aspect of the disclosure, a system for providing power to a load via a semiconductor device comprises a current limit circuit for preventing a current from exceeding a current threshold set at a prescribed level, and a foldback circuit for reducing the current threshold when a voltage across the semiconductor device is higher than a first value. The foldback circuit is configured to operate in a high-power mode to increase the current threshold above the prescribed level when the voltage across the semiconductor device is less than a second value.

In the high-power mode, the foldback circuit may maintain the current threshold at the prescribed level when the voltage across the semiconductor device is not less than the second value but does not exceed the first value. Further, the foldback circuit may reduce the current threshold when the voltage across the semiconductor device is higher than the first value.

In accordance with a further aspect of the disclosure, a local area network comprises at least a pair of network nodes, a network hub, and communication cabling for connecting the network nodes to the network hub to provide data communications. The network hub has a power supply device for providing power to a load over the communication cabling. The power supply device includes a current limit circuit for preventing an output current of the power supply device from exceeding a current threshold set at a prescribed level, and a foldback circuit for reducing the current threshold when an output voltage of the power supply device is lower than a prescribed voltage value. The foldback circuit is configured to operate in a high-power mode to increase the current threshold above the prescribed level.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a PSE foldback scheme programmable to operate in a high-power mode of a PoE system. It will become apparent, however, that the concepts described herein are applicable to any controllable foldback mechanism in any network. For example, the system of the present disclosure may be provided in a local area network (LAN) having a plurality of nodes, a network hub and communication cabling connecting the nodes to the network hub for providing data communications. The network hub may include a power supply device, and the communication cabling may be utilized for supplying power from the power supply device to a load.

Usually, a foldback mechanism is provided in power supplies and other voltage output circuits to reduce current in order to reduce the power dissipation of the output device when large current flows through it. Since power is the product of voltage and current, reducing the current causes the power dissipation to be reduced proportionally.

Figure 2:
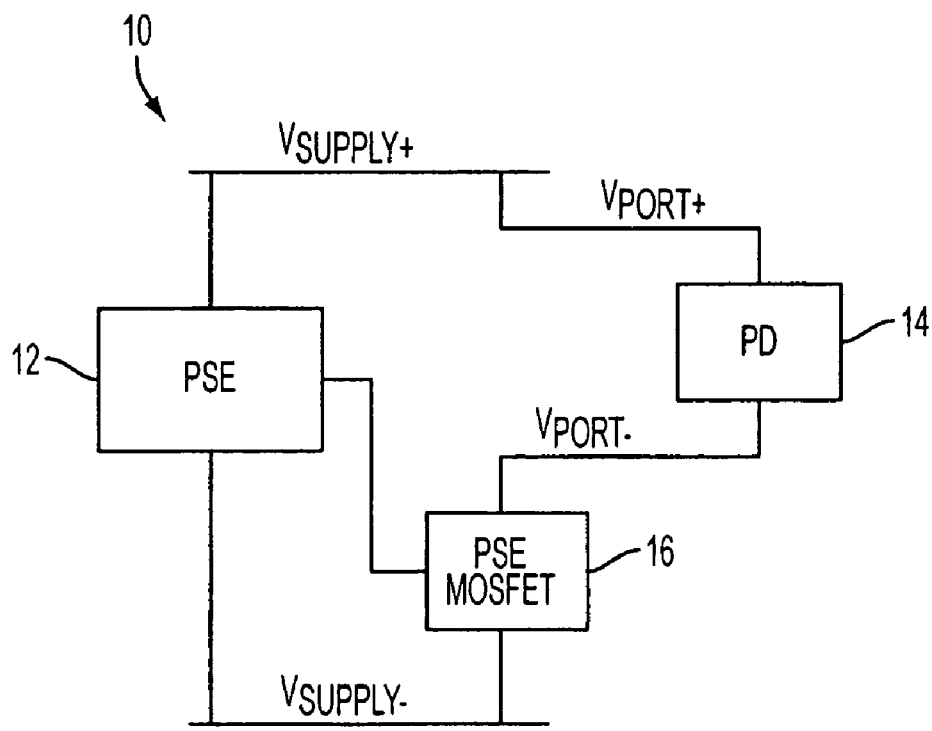
FIG. 2 is a diagram illustrating voltages applied in a PoE system of the present disclosure between a PSE and a PD.

FIG. 2 schematically illustrates voltages applied in a PoE system 10 between a PSE 12 and a PD 14. In particular, a PSE power supply may include positive terminal $Vsupply_+$ and negative terminal $Vsupply_-$. Delivery of power from the PSE 12 to the PD 14 may be provided using a PSE's output device, such as a power MOSFET 16 having the gate voltage controlled to supply power to the PD 14. An output port of the PSE 12 may include positive terminal $Vport_+$ and negative terminal $Vport_-$. The port voltage $Vport=Vport_+-Vport_-$ provided at the output of the PSE 12 is applied across the PD 14 to deliver the power $P_{PD}=(Vport_+-Vport_-) \times Iport$, where Iport is a port current. The power $P_{PSE}$ dissipated by the PSE's output device is equal to $V_{PSE} \times Iport$, where $V_{PSE}=Vsupply_- - Vport_-$ is the voltage applied across the PSE's output device.

During power-up and short-circuit conditions power dissipation in the MOSFET 16 may be much higher than power dissipation when nominal power is provided. To limit the power dissipation, a foldback mechanism is prescribed by the IEEE 802.3af standard. In particular, the standard defines that during startup for port voltages Vport between 10V and 30V, the minimum requirement for an output current in startup mode ($I_{Inrush}$) is 60 mA. For port voltages Vport above 30 V, the minimum $I_{Inrush}$ requirement is in the range from 400 mA to 450 mA. The minimum $I_{Inrush}$ requirement applies for duration $T_{LIM}$ set in the range between 50 ms and 75 ms.

Figure 3:
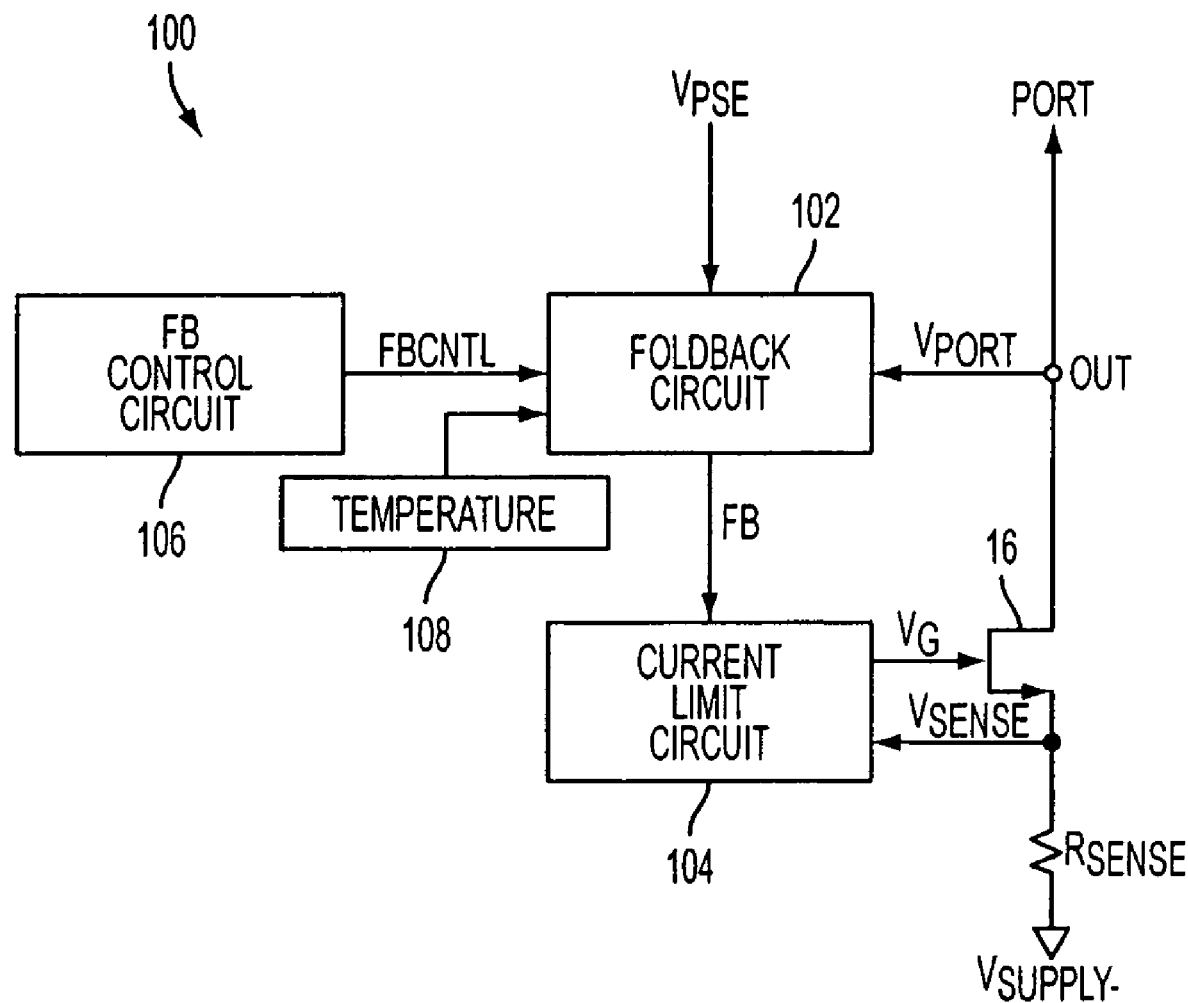
FIG. 3 is a block diagram illustrating a foldback mechanism of the present disclosure.

FIG. 3 is a block diagram illustrating a foldback mechanism 100 of the present disclosure. As disclosed in more detail below, in addition to satisfying the IEEE 802.3af foldback requirements, the foldback mechanism 100 enables the PoE system 10 to operate in a high-power mode to support a high-power PSE capable of providing higher power than the IEEE 802.3af standard requires.

The foldback mechanism 100 comprises a foldback circuit 102 that produces a foldback signal FB supplied to a current limit circuit 104 for controlling the port current (Iport) of the PSE 12 in accordance with foldback requirements. A foldback control circuit 106 supplies the foldback circuit 102 with a foldback control signal FBCNTL to set a desired foldback mode. A temperature sensing circuit 108 provides the foldback circuit 102 with a temperature signal to control a foldback procedure in accordance with temperature at or associated with MOSFET 16.

In particular, the current limit circuit 104 monitors the port current Iport and compares it with a current limit threshold to maintain the port current at or below the current limit threshold. The port current Iport is monitored by determining sense voltage Vsense across sense resistor Rsense connected to the MOSFET 16. The determined sense voltage is compared with a reference voltage Vref representing the current limit threshold to maintain the sense voltage at or below the Vref voltage. More specifically, when the sense voltage Vsense increasing with an increase in the port current approaches the reference voltage Vref, the current limit circuit 104 decreases gate drive voltage $V_G$ at the gate of the MOSFET 16. As a result, the resistance of the MOSFET 16 increases, reducing the port current Iport.

The current limit circuit 104 is controlled by the foldback circuit 102 that may change the current level threshold so as to achieve a required value of Iport. The foldback circuit 102 monitors the voltage Vport=$Vport_+$−$Vport_-$ applied across the PD 14, and the voltage $V_{PSE}$=$Vport_-$−$Vsupply_-$ applied across the MOSFET 16. The foldback circuit 102 may operate in a regular mode and two high-power modes, which may be set by the foldback control signal FBCNTL produced by the foldback control circuit 106. For example, the foldback control signal FBCNTL may have two bits, one of which may be set at a first level to establish the regular foldback mode, and at a second level to establish the high-power foldback mode. The other bit may be set at a first level to establish a first high-power foldback mode, and at a second level to establish a second high-power foldback mode.

The regular foldback mode may support power delivery to a PD that complies with the IEEE 802.3af power requirements. The high-power foldback modes may support supplying power to a high-power PD requesting higher power than the IEEE 802.3af standard requires the PSE to deliver.

Figure 1:
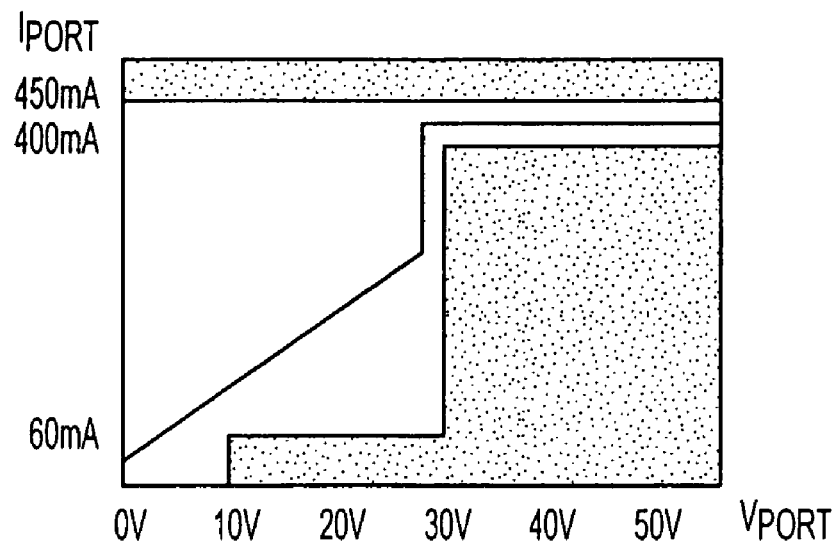
FIG. 1 is diagram illustrating the IEEE 802.3af foldback requirements.

In a regular foldback mode, the foldback circuit 102 may operate in accordance with the IEEE 802.3af foldback requirements illustrated in FIG. 1. In particular, it may monitor the port voltage Vport to reduce the current limit threshold when Vport is below 30V so as to reduce the port current Iport. Hence, in the regular foldback mode, the foldback circuit 102 allows the current limit circuit 104 to maintain the port current Iport at a level between 400 mA and 450 mA for Vport above 30V. For the port voltages Vport between 0V and 30V, the current limit threshold is controlled so as to gradually increase the port current, as shown in FIG. 1.

Figure 4:
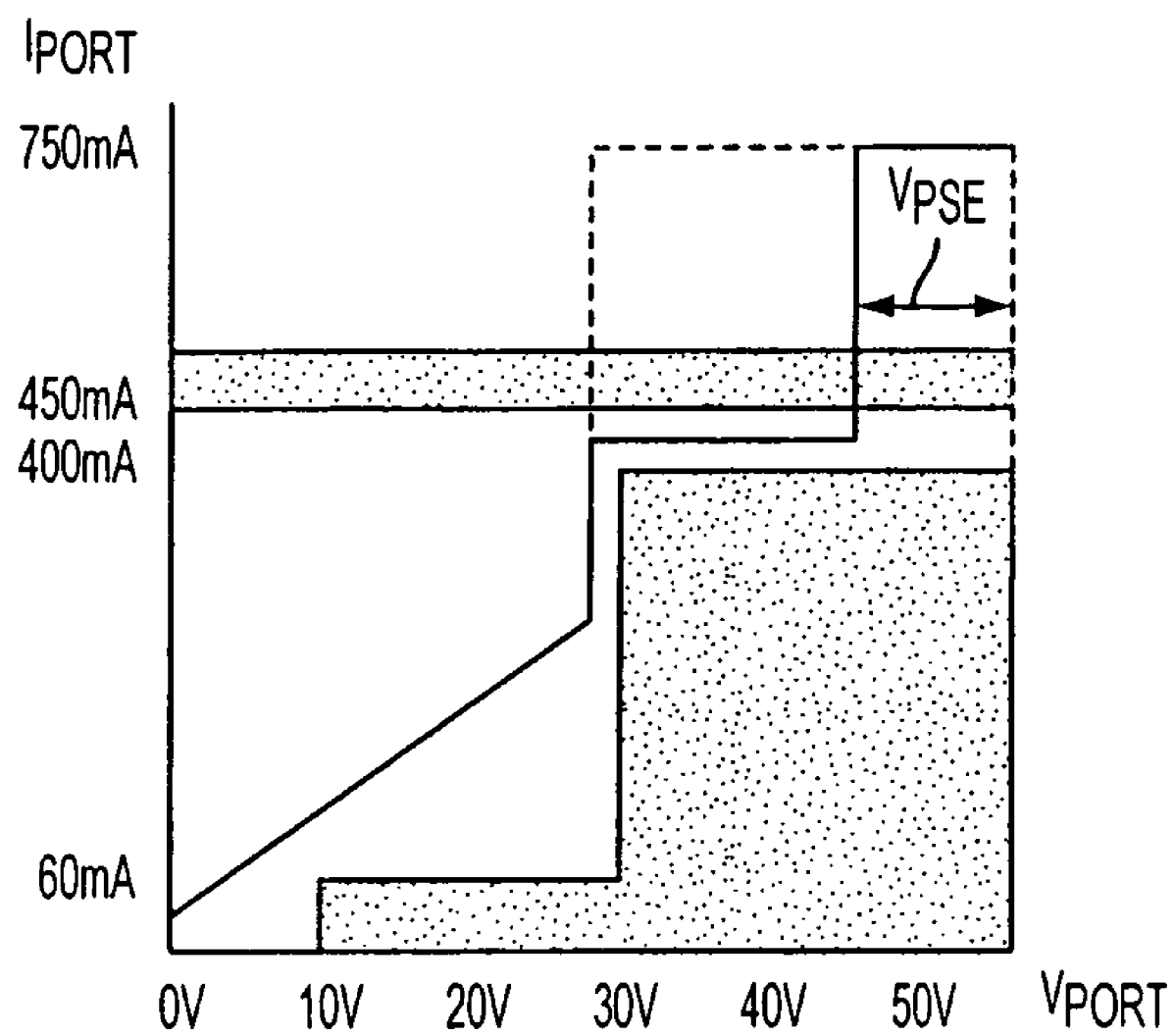
FIG. 4 is a diagram illustrating foldback curves in first and second high-power foldback modes

FIG. 4 illustrates foldback curves provided by the foldback circuit 102 in first and second high-power foldback modes. The foldback curves represent the Iport level at various Vport values. In a first high-power foldback mode, the foldback circuit 102 monitors the port voltage Vport. When the Vport is above 30V, the foldback circuit 102 controls the current limit threshold so as to maintain the port current Iport at a level substantially higher than the respective level maintained in the regular mode. For example, as illustrated by a dotted line in FIG. 4, in the first high-power foldback mode, the port current Iport may be maintained at a 750 mA level when the Vport is above 30V. For the port voltage Vport between 0V and 30V, the port current Iport may be gradually increased in a manner similar to operations in the regular foldback mode.

Accordingly, the first high-power foldback mode enables the PSE 12 to produce much larger port current than during the regular mode. As a result, higher power may be delivered to the PD 14. However, when the Vport is above 30V in the first high-power foldback mode, the PSE is required to dissipate much more power than during the regular foldback mode. Therefore, the first high-power foldback mode may be set when a PSE's output device, such as the MOSFET 16, is capable of dissipating high power.

The second high-power foldback mode may support delivery power to a high-power PD using a PSE's output device capable of dissipating lower power than the device used in the first high-power foldback mode. Moreover, the second high-power foldback mode enables the PSE 12 to deliver higher power than the IEEE 802.3af standard requires using an output device having power dissipation similar to power dissipation of a PSE's output device compliant with the IEEE 802.3af requirements.

As illustrated in FIG. 4, in the second high-power foldback mode, the foldback circuit 102 controls the current limit threshold to retain an IEEE 802.3 compliant characteristic when the port voltage Vport is between 0V and 30V. At the port voltage Vport above 30V, the foldback circuit 102 monitors the voltage $V_{PSE}$=$Vport_-$−$Vsupply_-$ applied across the MOSFET 16 to control the current limit threshold so as to switch the port current Iport in accordance with this voltage.

For example, as illustrated by a solid line in FIG. 4, the first portion of the foldback curve above a 30V Vport level is similar to the IEEE 802.3 compliant foldback curve shown in FIG. 1. However, when the voltage $V_{PSE}$ is less than a predetermined value, the foldback circuit 102 controls the current limit circuit 104 to maintain the port current Iport at a level substantially higher than the respective IEEE 802.3 compliant level.

By controlling the value of Iport in accordance with the voltage across the MOSFET 16, the power dissipation of the MOSFET 16 may be limited to a value that does not exceed the maximum MOSFET power dissipation defined in the IEEE 802.3af standard. For example, if the PSE 12 switches Iport to up to 1 A when the negative port potential ($Vport_-$) is less than 10V above the PSE's negative power supply potential ($Vsupply_-$), the power dissipation of the MOSFET 16 is limited to 10V×1A=10 W. This is less than the maximum MOSFET power dissipation encountered in a PSE that complies to the IEEE 802.3af standard. Accordingly, the second high-power foldback mode enables the PSE 12 to supply twice the current and twice the power to the PD 14 while using the same MOSFET as an IEEE 802.3af compliant PSE.

The foldback circuit 102 may be controlled by the temperature sensing circuit 108 that provides a temperature signal to control a foldback procedure in accordance with the temperature. A semiconductor device, such as the MOSFET 16, has a fixed maximum temperature at which it may degrade or fail. Therefore, the ability of the semiconductor device to dissipate power without damage depends on the temperature. In particular, the power dissipation of a semiconductor device decreases when the temperature increases. Power dissipation of a semiconductor device depends not only on its initial temperature, but also on the ambient temperature around it determined by the temperature of the air and elements, such as circuit boards or heat sinks, that receive heat when the semiconductor device dissipates power.

In a PSE, some of the circuits, such as control logic, run before substantial amounts of power dissipate. Therefore, the temperature of the semiconductor device used for supplying power from the PSE may give an indication of the semiconductor device's initial temperature and the ambient temperature around it. Accordingly, the temperature sensing circuit 108 may determine the temperature of the MOSFET 16 to control the foldback circuit 102 in accordance with this temperature.

Based on the temperature signal from the temperature sensing circuit 108, the foldback circuit 102 may change the value of the port voltage Vport, at which the port current Iport is switched to a higher level. In particular, this voltage value may be increased for higher temperatures. Alternatively, the foldback circuit 102 may perform a temperature-dependent step-wise transition from a lower Iport level to a higher Iport level so as to reduce the power dissipation of the MOSFET 16 and still remain the IEEE 802.3af standard compliant when the temperature rises.

In the first high-power foldback mode, in response to a higher temperature, the foldback circuit 102 may increase the port voltage Vport at which the port current Iport transitions to a higher level.

In the second high-power foldback mode, the predetermined value of $V_{PSE}$, at which the foldback circuit 102 initiates a transition from the IEEE 802.3 compliant level of Iport to a higher port current depends on temperature. As temperature rises, the predetermined value of $V_{PSE}$ may be reduced. Accordingly, at a higher temperature, the Iport current is switched from the IEEE 802.3 compliant level to a higher level when the voltage $V_{PSE}$ is less than a predetermined value smaller than the predetermined value of $V_{PSE}$ at a lower temperature.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for providing power over a communication link, comprising:
    a power supply device for providing power to a load over the communications link, the power supply device being configured to supply power via a semiconductor device,
    a current limit circuit for preventing an output current of the power supply device from exceeding a current threshold set at a prescribed current threshold level, and
    a foldback circuit for reducing the current threshold when an output voltage of the power supply device is less than or equal to a prescribed output voltage value,
    said foldback circuit being controlled to increase the current threshold above the prescribed current threshold level.

2. The system of claim 1, wherein the foldback circuit is configured to operate in a first mode to increase the current threshold above the prescribed current threshold level when the output voltage of the power supply device is greater than or equal to the prescribed output voltage value.

3. The system of claim 1, wherein the foldback circuit is configured to operate in a second mode to increase the current threshold above the prescribed current threshold level when a voltage across the semiconductor device is less than a prescribed semiconductor voltage value.

4. The system of claim 3, wherein in the second mode, the foldback circuit is operative to maintain the current threshold at the prescribed current threshold level when the voltage across the semiconductor device is greater than or equal to the prescribed semiconductor voltage value and the output voltage of the power supply device is greater than or equal to the prescribed output voltage value.

5. The system of claim 4, wherein in the second mode, the foldback circuit is operative to reduce the current threshold when the output voltage of the power supply device is lower than the prescribed output voltage value.

6. The system of claim 3, wherein at a first temperature of the semiconductor device, the foldback circuit increases the current threshold above the prescribed current threshold level when the voltage across the semiconductor device is less than a first prescribed semiconductor voltage value; and at a second temperature of the semiconductor device higher than the first temperature, the foldback circuit increases the current threshold above the prescribed current threshold level when the voltage across the semiconductor device is less than a second prescribed semiconductor voltage value smaller than the first prescribed semiconductor voltage value.

7. The system of claim 1, wherein the foldback circuit is configured to increase the current threshold above the prescribed current threshold level when a predetermined load is detected at an output of the power supply device.

8. The system of claim 3, wherein the foldback circuit is responsive to a first control signal to switch into the first mode, and is responsive to a second control signal to switch into the second mode.

9. The system of claim 8, wherein the foldback circuit is operative to switch into the first mode if the semiconductor device is a first type semiconductor device, and to switch into the second mode if the semiconductor device is a second type semiconductor device capable of dissipating less power than the first type semiconductor device.

10. The system of claim 1, wherein the semiconductor device includes a MOSFET.

11. A method of providing power to a load via a semiconductor device, comprising the steps of:
    setting a current threshold at a prescribed current threshold level to prevent an output current of a power supply from exceeding the current threshold,
    reducing the current threshold when an output voltage of the power supply is less than or equal to a prescribed output voltage value, and
    switching to a preset mode to increase the current threshold above the prescribed current threshold level.

12. The method of claim 11, further comprising the step of operating in a first mode to increase the current threshold above the prescribed current threshold level when the output voltage of the power supply is greater than or equal to the prescribed output voltage value.

13. The method of claim 11, further comprising the step of operating in a second mode to increase the current threshold above the prescribed current threshold level when a voltage across the semiconductor device is less than a prescribed semiconductor voltage value.

14. The method of claim 13, wherein in the second preset mode, the current threshold is maintained at the prescribed current threshold level when the voltage across the semiconductor device is greater than or equal to the prescribed semiconductor voltage value and the output voltage of the power supply is not less than the prescribed output voltage value.

15. The method of claim 14, wherein in the second mode, the current threshold is reduced when the output voltage of the power supply is lower than the prescribed output voltage value.

16. The method of claim 13, wherein at a first temperature of the semiconductor device, the current threshold is increased above the prescribed current threshold level when the voltage across the semiconductor device is less than a first prescribed semiconductor voltage value, and at a second temperature of the semiconductor device higher than the first temperature, the current threshold is increased above the prescribed current threshold level when the voltage across the semiconductor device is less than a second prescribed semiconductor voltage value smaller than the first prescribed semiconductor voltage value.

17. A system for providing power to a load via a semiconductor device, comprising:
a current limit circuit for preventing a current from exceeding a current threshold set at a prescribed current threshold level, and
a foldback circuit for reducing the current threshold when a voltage across the semiconductor device is higher than a first semiconductor voltage value,
said foldback circuit being configured to operate in a prescribed mode to increase the current threshold above the prescribed current threshold level when the voltage across the semiconductor device is less than a second semiconductor voltage value.

18. The system of claim 17, wherein in the prescribed mode, the foldback circuit is configured to maintain the current threshold at the prescribed current threshold level when the voltage across the semiconductor device is not less than the second semiconductor voltage value but does not exceed the first semiconductor voltage value.

19. The system of claim 18, wherein in the prescribed mode, the foldback circuit is configured to reduce the current threshold when the voltage across the semiconductor device is higher than the first semiconductor voltage value.

20. The system of claim 18, wherein at a first temperature of the semiconductor device, the foldback circuit increases the current threshold above the prescribed current threshold level when the voltage across the semiconductor device is less than a first semiconductor voltage level; and at a second temperature of the semiconductor device higher than the first temperature, the foldback circuit increases the current threshold above the prescribed current threshold level when the voltage across the semiconductor device is less than a second semiconductor voltage level smaller than the first semiconductor voltage level.

21. A local area network comprising:
at least a pair of network nodes,
a network hub, and
communication cabling for connecting the network nodes to the network hub to provide data communications,
the network hub having a power supply device for providing power to a load over the communication cabling, the power supply device including a current limit circuit for preventing an output current of the power supply device from exceeding a current threshold set at a prescribed current threshold level, and a foldback circuit for reducing the current threshold when an output voltage of the power supply device is greater than or equal to a prescribed output voltage value, said foldback circuit being configured to operate in a prescribed mode to increase the current threshold above the prescribed current threshold level.

* * * * *